UNITED STATES PATENT OFFICE 2,052,920

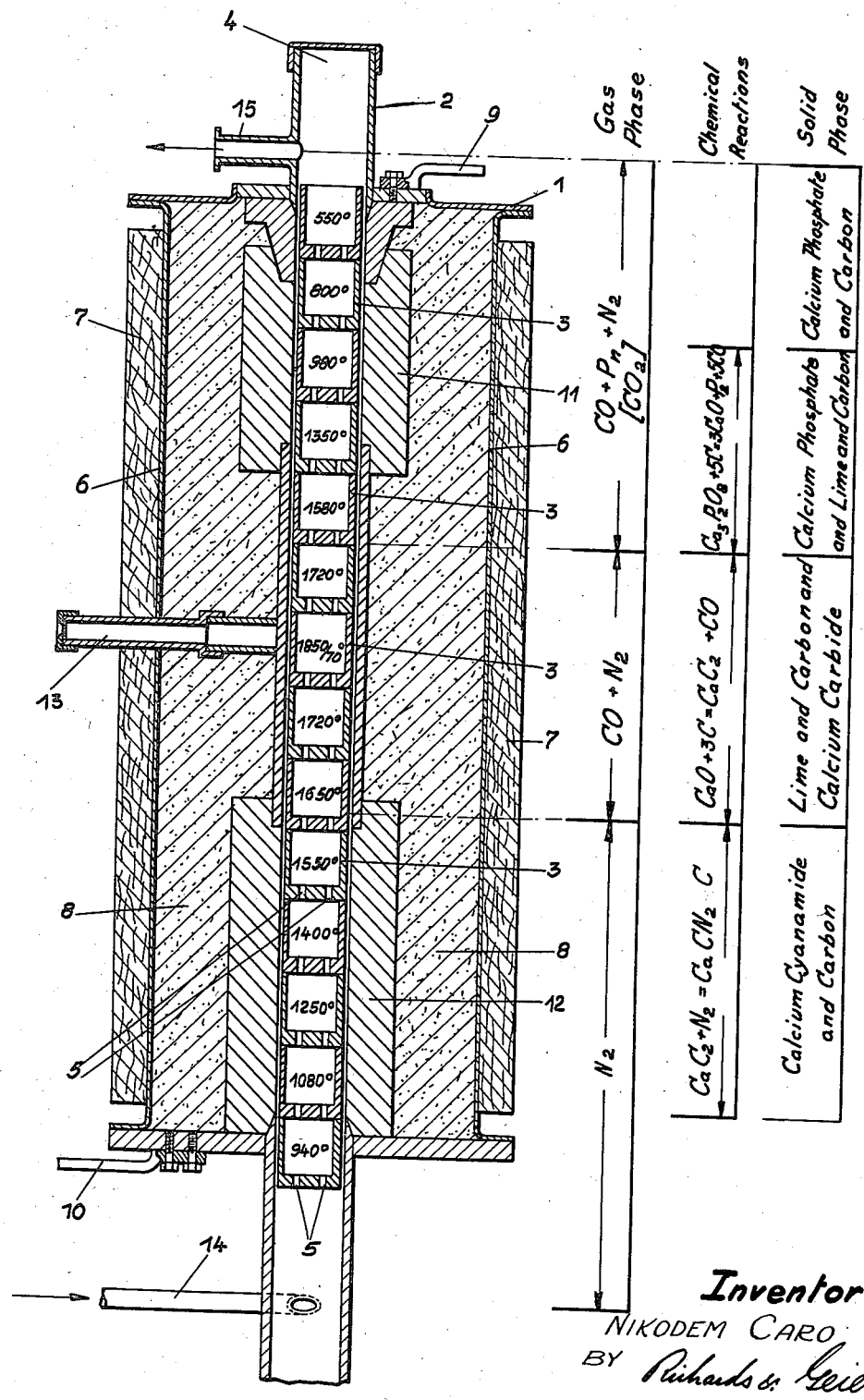

PROCESS OF PRODUCING CALCIUM CYANAMIDE

Nikodem Caro, Berlin-Dahlem, Germany

Application May 7, 1934, Serial No. 724,363
In Germany August 8, 1930

8 Claims. (Cl. 23—78)

This invention relates to a process for producing calcium cyanamide from calcium phosphate or phosphate-rock and is a continuation in part of my copending patent application Serial No. 555,359 filed August 5th, 1931.

In carrying out the process it is necessary to heat the reaction mixture at first for a time to a temperature from 1000–1600° C. until the resulting phosphorus has been completely set free. In case this degree of temperature is not maintained or the temperature increased before the total amount of phosphorus has been set free, it is impossible to obtain the final product free from phosphide, for, as soon as carbide has once formed in the presence of phosphorus, the simultaneously produced calcium-phosphide can under no circumstances be completely reduced.

A further characteristic feature of the present invention is, that the temperature is not raised to 1600–1900° C. before the phosphorus has been practically completely driven out. The temperature must be so high, that calcium carbide is formed under all circumstances, but the temperature should not exceed 1900° C., since in this case the carbide would melt together. In most of the hitherto known processes for the direct production of calcium cyanamide from carbide forming mixtures it has been overlooked, that carbide which once has been heated above 1900° C. is no more able to take up a sufficient amount of nitrogen during the subsequent cooling. At the earlier attempts to produce lime nitrogen directly from calcium compounds and a carbonaceous agent temperatures of about 2000° C. were used and these attempts did therefore not lead to the desired result.

It is already known to produce lime nitrogen directly from calcium phosphate. The known process is however conducted in such a manner, that already simultaneously with the formation of phosphorus also carbide or calcium nitrogen compounds are formed. The result of this is, that the end product still contains some phosphorus, since this substance cannot be removed after the formation of the carbide. One of the important features of the present process is, that the temperature of the reaction mixture is not raised to such a height that carbide is formed, before the phosphorus on a preceding lower temperature stage has been completely driven out. When the process is carried out in practice the first temperature stage must therefore be maintained for a longer time than hitherto, in order that the formation of calcium nitrogen compounds or of calcium carbide under all circumstances is prevented as long as phosphorus is still present in the reaction mixture. In the known process, moreover, the work is carried out by comparatively low temperatures by generator gas. The carbon monoxide of the generator gas interferes, however, both with the formation of carbide which is absolutely necessary for the production of lime nitrogen, as well as acting at the same time in a disintegrating manner on the lime nitrogen in course of production or already produced, so that satisfactory results could not be obtained according to this well-known process.

An essential characteristic feature of the invention is, that any contact between the calcium cyanamide formed and carbon monoxide is prevented, in order to avoid a decomposition of the cyanamide after the equation:

$$CaCN_2 + CO = CaO + 2C + N_2.$$

Producer gas must therefore under no circumstances be used. It is also necessary to prevent the carbon monoxide formed during the process from attacking the calcium cyanamide already formed. In the process in the first furnace zone a reaction takes place after the equation:

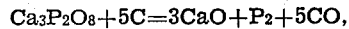
$$Ca_3P_2O_8 + 5C = 3CaO + P_2 + 5CO,$$

and in the second furnace zone the further reaction takes place after the equation:

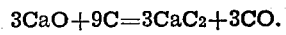
$$3CaO + 9C = 3CaC_2 + 3CO.$$

The nitrogen for the subsequent reaction in the third zone:

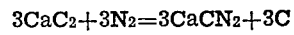
$$3CaC_2 + 3N_2 = 3CaCN_2 + 3C$$

must in accordance with the invention be introduced in counter-current to the material. If the reaction mass for instance is supplied at the top of the furnace and sinks slowly downward through the furnace, then the nitrogen must be conducted upwards from the lower part of the furnace, so that the carbon monoxide formed in the upper and the middle furnace zones is expelled at the upper end of the furnace and does not reach the lowermost zone in which the calcium cyanamide is formed.

In the last furnace zone, in which the formation of calcium cyanamide takes place, the material remains so long at temperatures of 1200–900° C. until no more nitrogen is taken up.

It is important when carrying out the process to prevent a complete fusion of the reaction mixture because otherwise the particles formed will combine to larger units, so that the nitrogen can no longer find sufficient surfaces of attack. This complete fusion of the carbide is avoided by maintaining the above mentioned temperatures. One can raise the temperature all the more, the more infusible the frame is which is produced by the reduction mediums. For this reason it is of particular advantage to use carbon which is free, as far as possible, from easily melting compounds especially from silicon compounds, that is peat, forge coal or even anthracite or similar materials.

In carrying out the process lime nitrogen can be obtained in the form which the initial material is started, i. e., for instance, by employing powder the final product will be in the form of powder, so that the grinding of the lime nitrogen is avoided which always is necessary in the nitrogen processes hitherto carried out.

The initial products may also be employed in the shape of briquettes or formed in a similar manner whereby the carbon in part may be added in the form of tar or similar binding material. The final product is then also obtained in a granulated form directly suitable for manuring.

A plant for performing the novel process is shown schematically by way of example in the accompanying drawing.

Briquettes formed from a mixture of calcium phosphate and a carbonaceous substance, substantially carbon are filled into carbon crucibles 3 and these crucibles are through the inlet opening 4 introduced into the shaft 2 of the furnace 1. The bottom of each crucible is formed with apertures 5 in order to facilitate the circulation of the gas. The furnace 1 consists of an iron shell 6 with an outer heat insulating jacket 7. The space intermediate the carbon tube 2 and the sheet metal shell 6 is filled with an insulating material 8. The heating current is over the leads 9 and 10 supplied to the annular carbon electrodes 11 and 12. The furnace is equipped with one or more openings 13 through which the temperature may be controlled. The nitrogen is introduced into the furnace through the tube 14, flows upward through the furnace from the bottom to the top and leaves the furnace through the tube 15. The material passes through the temperature stages indicated on the crucibles. Good results may for instance be obtained when the treatment is carried out in the following manner: The increase of temperature from 1200 to 1600° C. is distributed over several hours, in order that the phosphorus is completely driven out. For the formation of carbide the heating is continued for about 3 hours at 1850° C. and for about 1 hour at 1850–1870° C. The reaction mass is thereupon cooled, whereby the cooling may be performed in such a manner, that the reaction mass for instance for about 3 hours is kept at a temperature of 1100–1000° C. Tests made by a charge treated in the manner described above have shown, that after the heating to 1600° C. only 0.29% of non-volatile phosphorus was present in the form of phosphate and that no phosphides were present. The end product contained in this case 19.38% N, part of which was taken up already during the formation of the carbide and the greater part of which was taken up during the cooling.

Lime nitrogen which is free from objectionable contaminations and contains 19–22% of nitrogen may in this manner be easily produced in continuous or non-continuous operation and in a single process. The amounts of phosphorus and carbon monoxide present in the waste gases, which amounts will vary in accordance with the amount of scavenging nitrogen used, may be subjected to special treatments. The phosphorus may for instance in known way be converted to phosphorus pentoxide or phosphoric acid.

The duration of the heating at the different temperature stages is dependent on the absolute height of the temperature chosen. The higher the latter the shorter the required duration of the heating will usually be. It should however be taken into consideration, that lower temperatures usually will give more uniform products than higher ones.

If it is not desired to fill the material into crucibles the phosphate-carbon briquettes may be embedded in granulated coke or anthracite and these substances should then be of another size than the briquettes. The grains of carbon or coal should preferably be smaller than the briquettes of the reaction mass. The furnace shaft may in this case consist of a non-conductive highly refractory substance, for instance alumina. At the lower end of the furnace the finished product is drawn off continuously or periodically by means of a suitable transport device, whereby the column of material sinks downward in the shaft and fresh material is supplied at the top of the furnace. The material leaving the furnace is sorted into finished reaction mass and embedding material and the latter is reintroduced into the furnace at the top of the same.

The temperature may be controlled by regulating the voltage or by varying the speed with which the material travels through the furnace or by varying both these factors.

In the drawing adjacent the furnace the compositions of the gases and the solid substances in each furnace zone and the reactions taking place in these zones are indicated. In the uppermost furnace zone the solid substance consists of unaltered phosphate-carbon-mixture. In the first reaction space the phosphate-carbon-mixture is converted into lime, phosphorus and carbon monoxide. The solid matter therefore consists of phosphate, lime and carbon and the gaseous phase contains carbon monoxide, phosphorus, nitrogen and eventually some carbon dioxide. In the central hottest zone the formation of carbide takes place. The solid charge therefore consists of lime, carbon and carbide and the gaseous phase of nitrogen and carbon monoxide. In the lowermost reaction zone the formation of lime nitrogen takes place. The gaseous phase consists of nitrogen only, so that the lime nitrogen can not be destroyed by carbon monoxide.

As before mentioned the temperature of the reaction mixture is not raised to 1600–1900° C. before the phosphorus has been practically completely driven out. This means that the process must be carried out in such a manner, that the end product does not contain more than about 0.3% of phosphorus. With "pure nitrogen" a nitrogen is meant, which contains less than about 2% of contaminations.

Having fully described the invention, what I claim as new and desire to secure by Letters Patent is:

1. A process of producing calcium cyanamide from calcium phosphate, comprising the stages of treating calcium phosphate with a carbonaceous agent in the first furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, and cooling the obtained product in the last furnace zone, conducting nitrogen free from carbon monoxide counter-current to the materials in the last furnace zone and thereafter together with the gaseous products of the reaction counter-current to the solid materials in the remaining portion of the furnace, and avoiding contact between the calcium cyanamide formed and the carbon monoxide produced in the first and second furnace zones.

2. A process of producing calcium cyanamide from calcium phosphate, comprising the stages of treating calcium phosphate with a carbonaceous agent in the first furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, and cooling the obtained product in the last furnace zone, during this cooling keeping the material at a temperature of 1200–900° C. until no more nitrogen can be taken up, conducting nitrogen free from carbon monoxide counter-current to the materials in the last furnace zone and thereafter together with the gaseous products of the reaction counter-current to the solid materials in the remaining portion of the furnace, and avoiding a contact between the calcium cyanamide formed and the carbon monoxide produced in the first and second furnace zones.

3. A process of producing calcium cyanamide from calcium phosphate, comprising the stages of treating calcium phosphate with a substantially silicon-free carbonaceous agent in the first furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, and cooling the obtained product in the last furnace zone, conducting nitrogen free from carbon monoxide counter-current to the materials in the last furnace zone and thereafter together with the gaseous products of the reaction counter-current to the solid materials in the remaining portion of the furnace, and avoiding a contact between the calcium cyanamide formed and the carbon monoxide produced in the first and second furnace zones.

4. A process of producing calcium cyanamide from calcium phosphate, comprising the steps of mixing calcium phosphate with a carbonaceous agent, briquetting the mixture, treating same in the first furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, and cooling the obtained product in the last furnace zone, conducting nitrogen free from carbon monoxide counter-current to the materials in the last furnace zone and thereafter together with the gaseous products of the reaction counter-current to the solid materials in the remaining portion of the furnace, and avoiding a contact between the calcium cyanamide formed and the carbon monoxide produced in the first and second furnace zone.

5. A process of producing calcium cyanamide from calcium phosphate, comprising the steps of mixing calcium phosphate with carbon, briquetting the mixture, embedding same in an electrically conducting material in a furnace, subjecting said mixture and said material to a resistance heating in the first furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, and cooling the obtained product in the last furnace zone, conducting nitrogen free from carbon monoxide counter-current to the materials in the last furnace zone and thereafter together with the gaseous products of the reaction counter-current to the solid materials in the remaining portion of the furnace, and avoiding a contact between the calcium cyanamide formed and the carbon monoxide produced in the first and second furnace zone.

6. A process of producing calcium cyanamide from calcium phosphate, comprising the steps of mixing calcium phosphate with carbon, briquetting the mixture, embedding same in an electrically conducting granular material in a furnace, subjecting said mixture and said material to resistance heating in the first furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, and cooling the obtained product in the last furnace zone, conducting nitrogen free from carbon monoxide counter-current to the materials in the last furnace zone and thereafter together with the gaseous products of the reaction counter-current to the solid materials in the remaining portion of the furnace, and avoiding a contact between the calcium cyanamide formed and the carbon monoxide produced in the first and second furnace zone.

7. A process of producing calcium cyanamide from calcium phosphate, comprising the steps of mixing calcium phosphate with carbon, briquetting the mixture, embedding same in a furnace in pieces of carbon having another size than the briquettes, subjecting said mixture and said pieces of carbon to a resistance heating in the first furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, cooling the obtained product in the last furnace zone, conducting nitrogen free from carbon monoxide counter-current to the materials in the last furnace zone and thereafter together with the gaseous products of the reaction counter-current to the solid materials in the remaining portion of the furnace, and avoiding a contact between the calcium cyanamide formed and the carbon monoxide produced in the first and second furnace zone, sifting off the pieces of carbon from the material leaving the furnace, and reintroducing said pieces of carbon into the furnace for use as embedding material.

8. A process of producing calcium cyanamide from calcium phosphate, comprising the steps of mixing calcium phosphate with carbon, briquetting the mixture, embedding same in a vertical furnace in pieces of carbon of another size than the briquettes, supplying heating current to the material consisting of the reaction mass and the mass in which it is embedded through carbon rings which are arranged in spaced relation in the furnace and are separated from each other by an insulating material, thereby heating the material in the uppermost furnace zone at temperatures between 900–1600° C. until practically the entire phosphorus has been driven out, heating in the second furnace zone to a temperature of 1600–1900° C. the material from the first furnace zone which is freed from phosphorus and still does not contain any substantial amount of carbide to form calcium carbide, cooling the obtained product in the last furnace zone, conducting nitrogen free from carbon monoxide counter-current to the materials in the last furnace zone and thereafter together with the gaseous products of the reaction counter-current to the solid materials in the remaining portion of the furnace, and avoiding a contact between the calcium cyanamide formed and the carbon monoxide produced in the first and second furnace zone, sifting off the pieces of carbon from the material leaving the furnace, and reintroducing said pieces of carbon into the furnace for use as embedding material.

NIKODEM CARO.